United States Patent [19]

Matsubara et al.

[11] 4,169,006
[45] Sep. 25, 1979

[54] METHOD FOR BONDING STEEL PLATES AND COMPOSITION FOR USE THEREIN

[75] Inventors: Takashi Matsubara; Yoshiaki Fujimoto; Yushi Ishibashi, all of Nagoya, Japan

[73] Assignee: Toagosei Chemical Industry Co., Ltd., Tokyo, Japan

[21] Appl. No.: 809,144

[22] Filed: Jun. 22, 1977

[30] Foreign Application Priority Data

Jun. 22, 1976 [JP] Japan .................................. 51-72753
Oct. 15, 1976 [JP] Japan ................................ 51-122952
Nov. 12, 1976 [JP] Japan ................................ 51-135158

[51] Int. Cl.$^2$ ................................................ C09J 5/04
[52] U.S. Cl. ...................................... 156/315; 156/330; 156/331; 156/332; 156/309; 220/81 R; 427/386; 427/410; 428/418; 428/474; 428/458; 428/480; 528/272; 528/296; 528/297; 525/438
[58] Field of Search ............... 156/315, 332, 330, 331, 156/309; 427/386, 410; 428/418, 474, 458, 480; 220/81 R; 260/835, 75 R, 75 EP; 528/272, 297, 296

[56] References Cited

U.S. PATENT DOCUMENTS

| | | | |
|---|---|---|---|
| 2,936,296 | 5/1960 | Precopio et al. | 260/75 R |
| 3,047,525 | 7/1962 | Broadhead | 260/75 R |
| 3,182,041 | 5/1965 | Watkins et al. | 156/332 |
| 3,197,439 | 7/1965 | Frey | 260/75 R |
| 3,268,483 | 8/1966 | Klootwijk et al. | 260/75 EP |
| 4,035,436 | 7/1977 | Matsubara et al. | 156/331 |

FOREIGN PATENT DOCUMENTS 970760  9/1964  United Kingdom ..................... 427/410

*Primary Examiner*—John T. Goolkasian
*Assistant Examiner*—J. J. Gallagher
*Attorney, Agent, or Firm*—Sughrue, Rothwell, Mion, Zinn and Macpeak

[57] ABSTRACT

A method for bonding steel plates with a polyamide adhesive, comprising applying a composition comprising (1) a polyester resin comprising the reaction product of (a) a polycarboxylic acid component comprising at least one of a polycarboxylic acid, an anhydride thereof, an ester thereof or a mixture thereof with (b) a polyhydric alcohol component comprising at least one polyhydric alcohol or a mixture thereof, with at least some of one of the polycarboxylic acid component and the polyhydric alcohol component being trivalent or higher, and (2) a bisphenol A-type epoxy resin, on a steel plate; baking the coating by heating; juxtaposing the coated steel plates to be bonded with a polyamide adhesive therebetween; and bonding the steel plates with the polyamide adhesive, a primer composition for use therein and a polyester resin for use in the primer composition.

6 Claims, 4 Drawing Figures

CONVENTIONAL PROCESS

BONDABLE WHITE COATING PROCESS

BONDABLE WHITE AND VARNISH COATING PROCESS

BONDABLE VARNISH COATING PROCESS

METHOD FOR BONDING STEEL PLATES AND COMPOSITION FOR USE THEREIN

BACKGROUND OF THE INVENTION

1. Field of the Invention

This invention relates to a method for bonding steel plates with a polyamide-type adhesive and to a composition for use therein. More specifically, the invention relates to a method for bonding a steel plate wherein, prior to bonding, a composition comprising (1) a polyester resin obtained by reacting a polycarboxylic acid component with a polyhydric alcohol component and (2) a bisphenol A-type epoxy resin, is coated on the steel plate, and baked by heating.

2. Description of the Prior Art

According to the prior art techniques, many metallic containers such as cans for foodstuffs and general-purpose cans are made of steel plates with tin, the so-called tin plates, and the can body blanks are bonded by soldering. However, bonding by soldering has the defect that rust may occur in the cans due to hydrochloric acid, which is used to clean the soldered parts, remaining on the can, the aesthetic appearance of the cans may be impaired by the lack of printing at the soldered parts, or fumes of lead, a component of the solder used, may give rise to toxicity hazards.

In recent years, use of chromium-treated steel plates (TFS: tin-free steel-chromium type) which are less expensive and have superior printability have superseded the use of tin plates. Since this type of material cannot be soldered, methods have been developed to bond can bodies using an adhesive.

In many cases, polyamide-type adhesives are used to bond a can body using an adhesive. When polyamide-type adhesives are used, an adhesive primer is generally used. The primer actually used is a coating composition comprising a phenol formaldehyde/epoxy resin. However, when a primer of this type is used, the resin-coated surface turns to a yellow brown color upon baking, and the beauty of the surface is impaired.

Hence, when a composition of this type cannot be used as a varnish coat to be coated on an outside surface of can body because the coated film is colored, or high temperatures are required for curing the coated film by baking.

SUMMARY OF THE INVENTION

Extensive investigations have now been made in order to provide a coating composition which has superior properties both as a varnish coat and an adhesive primer. These investigations have led to the discovery that a composition comprising (1) a polyester resin obtained by reacting (a) a polycarboxylic acid component comprising a polycarboxylic acid, an anhydride thereof, an ester thereof or a mixture thereof with (b) a polyhydric alcohol component comprising at least one polyhydric alcohol or a mixture there of, with at least some of one of the polycarboxylic acid component (a) and the polyhydric alcohol component (b) being trivalent or higher, and (2) a bisphenol A-type epoxy resin, meets the requirements described above.

Accordingly this invention provides a method for bonding steel plates with a polyamide adhesive comprising applying a composition comprising (1) a polyester resin comprising the reaction product of (a) a polycarboxylic acid component comprising at least one of a polycarboxylic acid, an anhydride thereof, an ester thereof or a mixture thereof, with (b) a polyhydric alcohol component comprising at least one polyhydric alcohol or a mixture thereof, with at least some of one of the polycarboxylic acid component and the polyhydric alcohol component being trivalent or higher, and (2) a bisphenol A-type epoxy resin, on a steel plate; baking the coating by heating; juxtaposing the coated steel plates to be bonded with a polyamide adhesive therebetween; and bonding the steel plates with the polyamide adhesive.

In another embodiment of this invention, this invention provides a primer composition which comprises (1) a polyester resin comprising the reaction product of (a) a polycarboxylic acid component comprising at least one of a polycarboxylic acid, an anhydride thereof, an ester thereof or a mixture thereof, with (b) a polyhydric alcohol component comprising at least one polyhydric alcohol or a mixture thereof, with at least some of one of the polycarboxylic acid component and the polyhydric alcohol component being trivalent or higher, and (2) a bisphenol A-type epoxy resin.

In an even further embodiment of this invention, this invention provides a polyester resin composition useful as a component of a primer composition comprising the reaction product of (a) a polycarboxylic acid component comprising at least one of a polycarboxylic acid, an anhydride thereof, an ester thereof or a mixture thereof, with (b) a polyhydric alcohol component comprising at least one polyhydric alcohol or a mixture thereof, with at least some of one of polycarboxylic acid component and the polyhydric alcohol component being trivalent or higher.

BRIEF DESCRIPTION OF THE ACCOMPANYING DRAWINGS

FIGS. 1 to 4 of the accompanying drawings are sectional views of the bonded parts of can bodies.

DETAILED DESCRIPTION OF THE INVENTION

Figure 1:
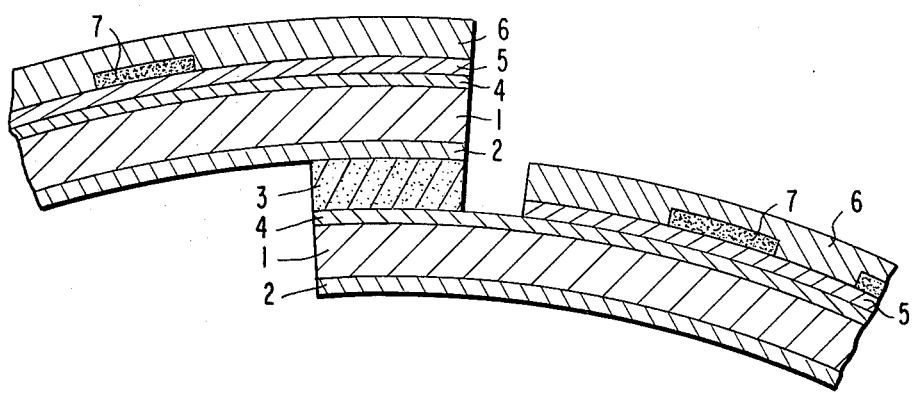

The starting materials for the polyester used in this invention comprise (a) a polycarboxylic acid component which comprises at least one member selected from a polycarboxylic acid, an anhydride thereof, an ester thereof, and a mixture thereof and (b) a polyhydric alcohol component comprising a polyhydric alcohol or a mixture thereof. At least some of one of the polycarboxylic acid component (a) and the polyhydric alcohol component (b) must be trivalent or higher. Hereinafter, trivalent or higher polycarboxylic acids will be referred to as component (a-1) and trivalent or higher polyhydric alcohols will be referred to as component (b-1). The trivalent or higher polycarboxylic acids as component (a-1) are those having 3 to 6, preferably 3 or 4, carboxylic acid groups. Preferably, the trivalent or higher polycarboxylic acids and the anhydrides or the esters thereof as component (a-1) are aromatic compounds. Specific examples of component (a-1) include trimellitic acid, pyromellitic acid, trimesic acid, trimellitic anhydride, pyromellitic anhydride, and the lower alkyl esters (including mono and polyalkyl esters e.g., having 1 to 6 carbon atoms in each alkyl moiety thereof) thereof, such as methyl or ethyl esters, of trimellitic acid, pyromellitic acid, or trimesic acid.

The trivalent or higher polyhydric alcohols as component (b-1) are those having 3 to 6, preferably 3 or 4, hydroxyl groups. Examples of suitable trivalent or higher polyhydric alcohols as component (b-1) are trimethylol propane, trimethylol ethane, pentaerythritol, dipentaerythritol, glycerol, diglycerol, sorbitol, mannitol, 1,2,6-hexanetriol, and tris-(β-hydroxyethyl) isocyanurate.

Since at least some of one of component (a) and component (b) must be trivalent or higher, when component (b-1) is used as the component (b), a dicarboxylic acid or an anhydride or ester thereof [to be referred to hereinafter as component (a-2)] can be used as the polycarboxylic acid component (a), and when component (a-1) is used as component (a), a dihydric alcohol [to be referred to hereinafter as component (b-2)] can be used as the polyhydric alcohol component (b).

Suitable examples of component (a-2) which can be used include aromatic dicarboxylic acids or anhydrides, for example, terephthalic acid, isophthalic acid, phthalic acid, methylterephthalic acid, methylisophthalic acid, 2,6-naphthalenedicarboxylic acid, phthalic anhydride, and the lower alkyl esters of these dicarboxylic acids, e.g., having 1 to 6 carbon atoms in the alkyl moiety thereof such as dimethyl terephthalate or dimethyl 2,6-naphthalenedicarboxylate; and aliphatic dicarboxylic acids or anhydrides such as maleic anhydride and succinic anhydride.

Suitable examples of component (b-2) which can be used include various dihydric alcohols which are generally used as materials for polyesters, such as ethylene glycol, propylene glycol, butanediol, neopentyl glycol, hexanediol, bisphenol A, and resorcinol.

Suitable proportions of components (a-1), (b-1), (a-2) and (b-2) which can be employed are such that the weight ratio of component (a-1)/component (a-2) is about 1:9 to about 10:0, and the weight ratio of component (b-1)/component (b-2) is about 1:9 to about 10:0.

Some representative examples of specific combinations of these components (a) and (b) described above are listed below.
Trimellitic anhydride—Ethylene glycol,
trimetllitic anhydride—Neopentyl glycol,
Trimellitic anhydride—Bisphenol A,
Trimellitic anhydride—Resorcinol,
Trimellitic anhydride—Trimethylol propane,
Trimellitic anhydride—Pentaerythritol,
Trimellitic anhydride/Phthalic anhydride—Ethylene glycol,
Trimellitic anhydride/Phthalic anhydride—Neopentyl glycol,
Trimellitic anhydride/Phthalic anhydride—Pentaerythritol,
Trimellitic anhydride/Phthalic anhydride—Trimethylol propane,
Succinic anhydride—Trimethylol propane,
Maleic anhydride—Trimethylol propane,
Phthalic anhydride—Pentaerythritol,
Pyromellitic anhydride/Phthalic anhydride—Ethylene glycol,
Pyromellitic anhydride/Phthalic anhydride—Neopentyl glycol,
Pyromellitic anhydride/Phthalic anhydride—Trimethylol propane.

The starting materials for the polyester used in this invention are components (a) and/or (b) as essential components with at least some of one of component (a) and (b) being trivalent or higher. If desired combinations of components (a-1) with (a-2) and (b-1) with (b-2) can be used. Desirably, the amounts of these components are determined such that the ratio of the polycarboxylic acid component (a) to the polyhydric alcohol component (b) (R value), defined by relationship (1) below, is within the range of about 0.5 to about 2.

$$R = \frac{M_{a\text{-}1} + M_{a\text{-}2}}{H_{b\text{-}1} + H_{b\text{-}2}} \quad (1)$$

where
$M_{a\text{-}1}$ is the total moles of component (a-1),
$M_{a\text{-}2}$ is the total moles of component (a-2),
$H_{b\text{-}1}$ is the total hydroxyl equivalents of component (b-1),
$H_{b\text{-}2}$ is the total hydroxyl equivalents of component (b-2).

By adjusting the R value to this range, polyesters containing at least three terminal carboxyl groups per molecule can be obtained.

If the R value is less than about 0.5, the residual free hydroxyl groups in the polyester increases, and the curing reaction between the polyester and the epoxy resin is insufficient. Moreover, the performance of the reaction product as a coating agent tends to be deteriorated. On the other hand, if the R value exceeds about 2, the amount of unreacted acid increases, and the resulting resin tends to be thermally unstable and the coated film tends to be colored. If the R value is at least about 0.5, the resulting polyester always have excess terminal carboxyl groups.

The polyesters can be prepared using methods generally employed commercially, for example, using a method comprising mixing the polycarboxylic acid component (a) and the polyhydric alcohol component (b), and heat-melting the mixture to react it. In the present invention, this may also be performed by a solution-polymerization method in which the starting materials are reacted dissolved or dispersed in a suitable solvent. This type of reaction is especially preferably used when a trivalent or higher carboxylic acid or anhydride thereof (component (a-1)) and a trihydric or higher alcohol (component (b-1)) are used as starting materials. When the reaction is carried out in a solvent, the control of the reaction is relatively easy, and the composition of the product is reproducible.

Suitable solvents which can be used for the synthesis of polyesters may be common organic solvents except those solvents reactive with the starting material polycarboxylic acids and polyhydric alcohols (for example, alcohol-type solvents). Specific examples of suitable solvents are esters such as methyl Cellosolve acetate, ethyl Cellosolve acetate, butyl Cellosolve acetate or methoxybutyl acetate, ketones such as methyl isobutyl ketone, acetophenone or isophorone, and aromatic hydrocarbons such as toluene, xylene or other alkylbenzenes. The solvent can be used either individually or as an admixture of two or more thereof. The reaction system need not necessarily be homogeneous during the reaction, and a part of the starting materials or reaction product may be present as a slurry. The use of solvents which have the ability to dissolve the starting materials and the reaction product to a higher extent than a certain point is preferred since it will narrow the molecular weight distribution of the reaction product.

Preferably, the amount of polyester-forming materials at the beginning of the reaction is about 10 to about 80% by weight based on the reaction solvent.

The reaction temperature at the time of producing the polyesters will vary depending on the melting points and boiling points of the starting materials used, the abovedescribed components and proportions thereof (in order to prevent gellation during the manufacture of polyesters), the presence or absence of a catalyst, and the boiling point of the reaction solvent, but usual esterification temperatures (about 120° to about 250° C.) can be employed. The reaction time generally ranges from about 5 minutes to about 8 hours. If the reaction temperature and the reaction time are insufficient, the polyester-forming reaction is uncomplete, and the presence of residual starting material deteriorates the properties of the reaction product as a coating agent. If the reaction temperature is too high and the reaction time is too long, polyesters suitable for the practice of the present invention cannot be obtained because of a volatilization and thus a loss of the starting materials, for example. Also there is an increasing probability of inducing gellation. Hence, care must be taken with respect to reaction temperature and time.

Further, when a polyester is produced with a trivalent or higher polycarboxylic acid and polyhydric alcohol, a small amount of a dicarboxylic acid or a dihydric alcohol can be added to the system to prevent gelation. The amount of such a dicarboxylic acid or dihydric alcohol varies depending upon the combination in the system, but generally is more than about 3% by weight, preferably 10 to 50% by weight based on the total weight of the polycarboxylic acid or the polyhydric alcohol, respectively.

The polyester-forming reaction can be carried out in the absence of a catalyst. If desired, the polyester-forming reaction can be conducted in the presence of a catalyst and known esterification catalysts, ester-interchange catalysts and polymerization catalysts may be used. Suitable examples of such catalysts are oxides, salts, complexes or esters containing metals such as Li, Na, K, Rb, Cs, Ca, Mg, Sr, Ba, Zn, Cd, B, Al, Pb, Mn, Fe, Co, Sb, Sn, Si, La, Ti, Ge, and Ce. A suitable amount of the catalyst is about 0.01 to about 1% by weight based on the weight of the starting materials.

The polyesters so obtained contain mainly carboxyl groups at the terminals, thereof and have an acid number of about 30 to about 1,000 (mgKOH/g of resin) and a weight average molecular weight, determined by gel permeation chromatography, of about 500 to about 10,000.

Bisphenol A-type epoxy resins obtained by the reaction of epichlorohydrin with bisphenol A are as component (2). Suitable epoxy resins which can be used are available commercially under the trademarks of EPIKOTE 1004, 1007 and 1009 (products of Shell Chemical Co.), ARALDITE GY-6097 and GY-6099 (products of Ciba-Geigy), and EPOMIKR-307 and R-309 (products of Mitsui Kanebo Epoxy Co., Ltd.). Preferred epoxy resins for component (2) are bisphenol A-type epoxy resins having an epoxy equivalent of about 1200 g/eq. or more.

The suitable ratio of the polyester resin (1) to the epoxy resin (2) (weight ratio of the nonvolatile content) is about 2:98 to about 50:50, preferably 4:96 to 40:60. And in order to prepare the composition comprising polyester resin (1) to epoxy resin (2), the components are simply mixed.

Suitable methods which can be used for coating the composition consisting of the polyester (1) and the epoxy resin (2) on a can blank are not particularly limited. Usually, the polyester (1) and the epoxy resin (2) are dissolved in at least one solvent selected, for example, from ketones such as acetone, methyl ethyl ketone, methyl isobutyl ketone or cyclohexanone, aromatic hydrocarbons such as benzene, toluene, xylene or other alkylbenzenes, and esters such as methyl Cellosolve acetate, ethyl Cellosolve acetate or butyl Cellosolve acetate, methoxybutyl acetate. A suitable amount of the solvent employed is that amount which results in a solid content (i.e., epoxy resin and polyester resin) of about 10 to about 50% by weight, preferably 20 to 40% by weight. The resulting solution is then coated on the can blank in a conventional manner. Then, the solvent is removed by drying, and the coating is baked. When or after the composition is dissolved in a solvent, the entire mixture may be heated to some extent. Needless to say, when the polyester is produced in the presence of a solvent, it is not necessary to remove the solvent from the polyester.

The kinds of steel plate which can be used in this invention include tin-free chromium-treated steel plates (TFS), ultrathin chrome-plated steel plates, ultrathin aluminum-plated steel plates, ultrathin nickel-plated steel plates, non-treated cold rolled steel plates, tin plates, and galvanized iron plates.

Characteristic features of the invention are that a broad range of baking temperatures can be employed, and variations of the baking temperature within this range do not adversely affect the bond strength of the bonded steel plates, the aesthetic appearance of the coated surface, etc. Another important characteristic is that coated films of various thicknesses obtained by the method of this invention fully retain their bond strength, aesthetic beauty, and protective property. When a composition of (1) the polyester resin and (2) the bisphenol A-type epoxy resin is used, a suitable thickness of the coating after baking can be about 5 to about 200 mg/dm$^2$, and from the standpoint of the effect of the thickness on bond strength, etc., a preferred thickness is 10 to 170 mg/dm$^2$.

Accordingly, the coating composition of the polyester resin (1) and the bisphenol A-type epoxy resin (2) used in this invention is employed not only as a resinous component for a base coat (a primer coat for the inside surface of a can) concurrently acting as an adhesive primer, but also as a size coat (a primer coat for the outside surface of a can) concurrently acting as an adhesive primer, a resinous component for a varnish coat used to form a protective film on the printing ink on the outside surface of a can, and as a resinous component for a white coat (a coating agent comprising a white pigment and a resinous component to be coated on the outside surface of a can).

Since the composition also acts as an adhesive primer when used as a resinous component for a varnish coat and a white coat, it is called a bondable varnish coat when used for the former, and a bondable white coat when used for the latter.

Generally, the baking of the coated film of the above coating composition is generally performed at a temperature of about 150° to about 260° C. for about 30 seconds to about 30 minutes, especially at a temperature of 160° to 230° C. for 3 to 20 minutes.

A suitable baking temperature is 160° to 185° C. when the baking time is 10 minutes, if the properties of the coated film as a varnish coat are taken into consideration. At lower temperatures, the curing of the epoxy resin (2) is insufficient, and it is impossible to obtain the hardness and mechanical strength required for the protection of the printed surface. At higher temperatures, a discoloration of the printing ink will occur. Optimum baking conditions are therefore temperatures of 160° to 185° C. for periods of 5 to 15 minutes.

In order to cover the raised and depressed parts of the printed surface completely and impart sufficient gloss, the thickness of the coated film must be at least about 40 mg/dm². From an economical standpoint, the thickness of the coating is preferably as small as possible, and usually a suitable thickness is 50 to 70 kg/dm².

FIGS. 1 to 4 of the accompanying drawings are sectional views of the bonded parts of can bodies, illustrating combinations of various can making paints used in the production of bonded cans. FIG. 1 shows a combination of paints used to produce a conventional bonded can. That part of a steel plate (1) which is to be the inside of a can is coated all over with a base coat (2). The other surface of the steel plate which is to be the outside of the can is first coated all over with a size coat (4) which acts as an adhesive primer, and then a white coat (5) is coated on top of it (depending upon the printed design on the outside surface of the can, this white coat (5) may sometimes be omitted). Since the vehicle used in the conventional white coat (5) does not act as an adhesive primer, the lap seam portion of the can body (namely, that part of the can body to which an adhesive (5) is to be applied) should not be coated. Printing is accomplished on the white coat (5) by using a printing ink. The ink (7) should also not be applied to the lap seam part of the can body. To protect the ink (7), it is coated with a varnish coat (6). Since the varnish coat (6) also does not act as an adhesive primer for the polyamide-type adhesive, the lap seam part of the can body should not be coated as in the case of the white coat (5). Hence, in this case, bonding is effected by inserting the polyamide adhesive (3) between the inside base coat (2), and between the outside size coat (4).

Figure 2:
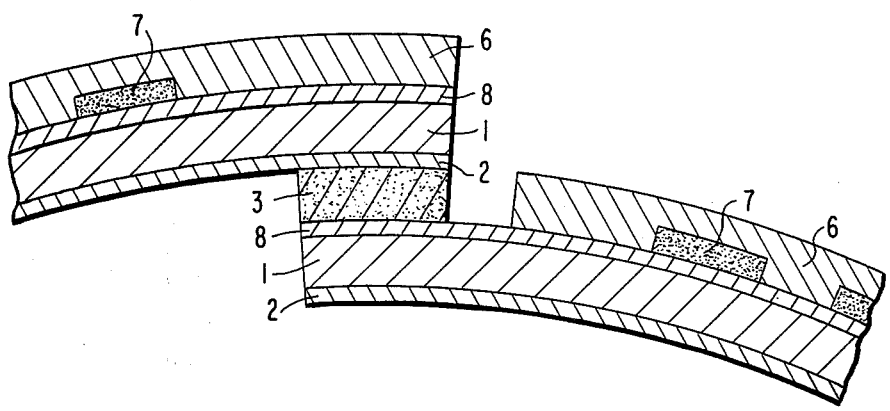

FIG. 2 shows one embodiment of the present invention in which a white coat (namely a bondable white coat) concurrently acting as a size coat (4) and white coat (5) is used. The coating of the inside of the can body is performed in the same way as in the case of FIG. 1. The outside surface is coated by first applying a bondable white coat (8) directly to the steel plate. Since the bondable white coat (8) has much better adhesion strength to a steel plate than ordinary white coat (5) and has good processability, it is not necessary, in contrast to the situation of FIG. 1, to apply size coat (4) between the steel plate and the white coat. In contrast to the situation of FIG. 1, the bondable white coat (8) is also applied to the lap seam part of the can body. Ink (7) and varnish coat (6) on the bondable white coat (8) are applied in the same way as in FIG. 1.

Figure 3:
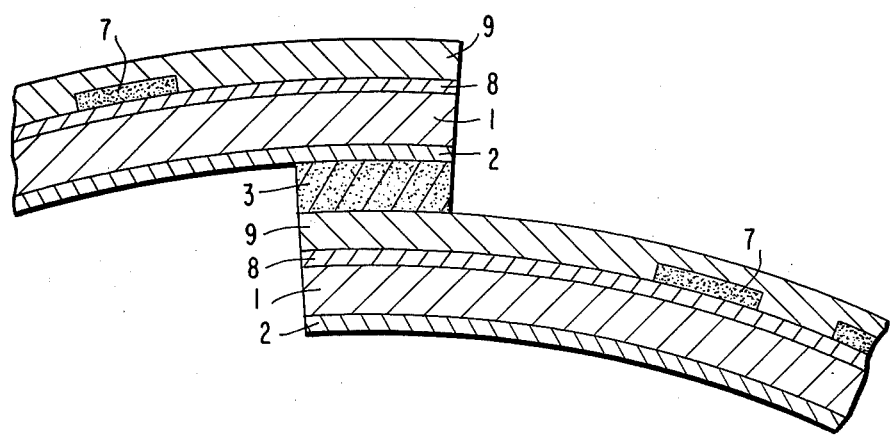

FIG. 3 shows another embodiment of the present invention in which a varnish coat (bondable varnish coat) acting also as an adhesive primer for a polyamide-type adhesive is used as the varnish coat (6). It can be applied, in contrast to the situation with FIG. 2, to the entire surface of a bondable white coat (9) including the lap seam part of the can body. In this combination; all the paints except the ink can be applied to the entire surface.

Figure 4:
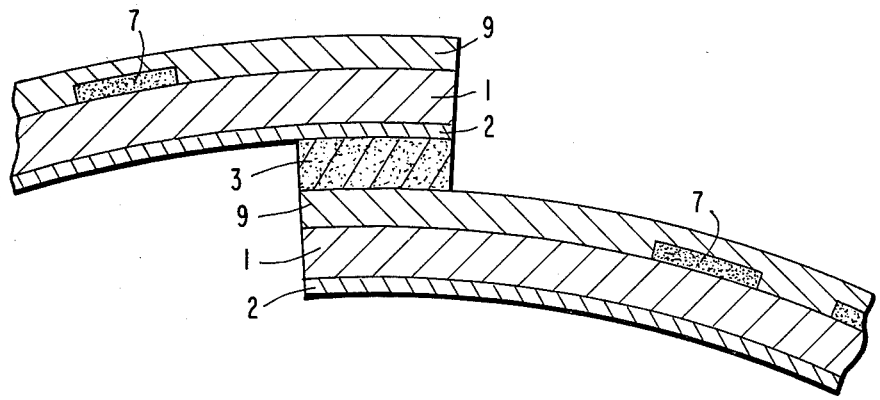

FIG. 4 shows still another embodiment of this invention wherein the bondable white coat (8) is omitted. In this case, ink (7) is printed directly on the steel plate (1), and then the bondable varnish coat (9) is applied entirely to the printed surface.

The number of coating operations required to coat the outside surface of a can body (except for the application of a printing ink) is three in the case of an ordinary bonded can as shown in FIG. 1, two in the case of FIG. 2, two in the case of FIG. 3, and one in the case of FIG. 4. Thus, the use of the bondable white coat and the bondable varnish coat in accordance with this invention can simplify the coating process.

The polyamide-type adhesive that can be used in this invention may comprise various polyamides, for example nylon 6, nylon 6-6, nylon 6-10, nylon 6-12, nylon 11, nylon 12, various copolymerized nylons, N-alkyl substituted nylons, condensed polyamides derived from condensed acids of unsaturated fatty acids such as dimeric acid and diamines, blends of at least two of these nylons, and blends of these nylons with suitable amounts of ionomer resins or polyethylene resin. Suitable examples of polyamide-type adhesives which can be used are described in U.S. Pat. No. 3,833,442 and in U.S. patent application Ser. No. 631,249, filed Nov. 12, 1975 now U.S. Pat. No. 4,035,436, the disclosures of which are incorporated herein by reference.

A steel plate can be bonded by first applying the above-described primer composition of this invention to the surface of the steel plate, baking the coated film, inserting a polyamide-type adhesive in a film form between the two coated layers at the edges of the steel plate, and then bonding the edges at a temperature sufficient to melt the polyamide resin. For example, when nylon 12 is used, the bonding temperature is about 200° to about 300° C., preferably 210° to 270° C. The bonding is completed by bumping the can blank with a hammer cooled to about 0° to about −40° C. A sufficient bonding time is about 0.01 to about 1 second which is the usual line speed in manufacturing bonded cans.

The following Reference Examples and Examples are given to illustrate the present invention more specifically. Unless otherwise indicated, are parts, percents, ratios and the like are by weight.

REFERENCE EXAMPLES 1 to 16

An esterification reactor equipped with a stirrer was charged with the starting materials shown in Table 1, and the esterification was performed under the conditions shown in Table 1 below to produce Polyesters A to P. The acid values and number average molecular weights of Polyesters A to P are also given in Table 1 below.

Table 1

| | Reference Example | | | | | | | |
|---|---|---|---|---|---|---|---|---|
| | 1 | 2 | 3 | 4 | 5 | 6 | 7 | 8 |
| Starting Materials | | | | | | | | |
| Component (a-1)* | TMA (832) | TMA (890) | TMA (787) | TMA (478) | TMA (447) | TMA (850) | TMA (826) | TMA (636) and PMA (181) |
| Component (b-1) | — | — | — | — | TMP (208) | PET (150) | TMP (174) | PET (183) |
| Component (a-2) | — | — | — | PA (368) | PA (345) | — | — | — |
| Component (b-2) | EG (168) | EG (110) | NPG (213) | EG (154) | — | — | — | — |
| (a-1):(a-2) mole ratio | — | — | — | 1.0 | 1.0 | — | — | — |

Table 1-continued

| | | | | | | | | |
|---|---|---|---|---|---|---|---|---|
| R Value | 0.8 | 1.3 | 1.0 | 1.0 | 1.0 | 1.0 | 1.1 | 1.0 |
| Solvent | | | | | | | | |
| Compound | — | — | — | — | — | BCA | BCA | ECA |
| Concentration of Materials (% by weight) | — | — | — | — | — | 50 | 65 | 30 |
| Catalyst | | | | | | | | |
| Compound | — | — | — | $ZnCl_2$ | — | — | — | — |
| Amount(% by weight) | — | — | — | 0.05 | — | — | — | — |
| Reaction Conditions | | | | | | | | |
| Temperature (°C.) | 170 | 180 | 200 | 160 | 180 | 170 | 170 | 150 |
| Time (minutes) | 30 | 30 | 30 | 90 | 90 | 20 | 15 | 30 |
| Polyester | | | | | | | | |
| Acid Value (calculated as non-volatile content) | 320 | 437 | 420 | 414 | 350 | 492 | 485 | 472 |
| Number Average Molecular Weight | 2300 | 2000 | 2200 | 1500 | 2000 | 950 | 800 | 1000 |
| Designation | A | B | C | D | E | F | G | H |

| | Reference Example | | | | | | | |
|---|---|---|---|---|---|---|---|---|
| | 9 | 10 | 11 | 12 | 13 | 14 | 15 | 16 |
| Starting Materials | | | | | | | | |
| Component (a-1)* | TMA'(781) | — | TMA (627) | — | — | TMP (777) | — | — |
| Component (b-1) | — | TMP (683) | — | PET (850) | TMP (691) | — | — | — |
| Component (a-2) | — | MA (317) | — | PA (150) | SA (309) | — | PA (827) | PA (861) |
| Component (b-2) | 1,6-HD(219) | — | BP-A (373) | — | — | R (223) | EG (173) | EG (139) |
| (a-1):(a-2) mole ratio | — | — | — | — | — | — | — | — |
| R Value | 1.0 | 1.0 | 1.0 | 1.0 | 1.0 | 1.0 | 1.0 | 1.3 |
| Solvent | | | | | | | | |
| Compound | — | BCA | BCA | BCA | BCA | BCA | BCA | — |
| Concentration of Materials (% by weight) | — | 50 | 50 | 50 | 50 | 50 | 50 | — |
| Catalyst | | | | | | | | |
| Compound | TBT | — | — | — | — | — | — | $ZnCl_2$ |
| Amount (% by weight) | 0.05 | — | — | — | — | — | 0.05 | — |
| Reaction Conditions | | | | | | | | |
| Temperature (°C.) | 200 | 180 | 180 | 180 | 170 | 180 | 180 | 200 |
| Time (minutes) | 60 | 10 | 10 | 10 | 15 | 10 | 10 | 120 |
| Polyester | | | | | | | | |
| Acid Value (calculated as non-volatile content) | 322 | 335 | 435 | 379 | 404 | 553 | 286 | 269 |
| Number Average Molecular Weight | 1200 | 530 | 350 | 550 | 505 | 380 | 200 | 2000 |
| Designation | I | J | K | L | M | N | O | P |

*Weight ratio of components shown in parenthesis.
Note:
TMA = trimellitic anhydride
PA = phthalic anhydride
PMA = pyromellitic anhydride
MA = maleic anhydride
SA = succinic anhydride
EG = ethylene glycol
NPG = neopentyl glycol
TMP = trimethylol propane
PET = pentaerythritol
1,6-HD = 1,6-hexanediol
BP-A = bisphenol-A
R = resorcinol
BCA = butyl Cellolsolve acetate
ECA = ethyl Cellosolve acetate
TBT = tetrabutyl titanate
TMA' = trimellitic acid

EXAMPLES 1 to 5 AND COMPARATIVE EXAMPLE 1

Each of Polyesters A to E and P synthesized in Reference Examples 1 to 5 and 16 was mixed with a bisphenol A type epoxy resin (EPIKOTE 1009, a product of Shell Chemical Co.; epoxy equivalent: 2600 to 3500 g/equivalent; OH content: 0.40 g equivalent KOH/100 g of resin) so that the weight ratio of the polyester (1) to the epoxy resin (2) became 1:9 and 2:8, respectively. The mixture was dissolved in a mixed solvent of 2 parts by weight of methyl Cellosolve acetate and 1 part by weight of an isomeric mixture of xylenes to form a solution having a nonvolatiles concentration of 30%.

The resin solution was coated on a chrome-treated steel plate (CANSUPER, 0.17 mm thick, a product of Nippon Steel Corporation), dried in the air, and then baked in a hot air drying oven at 170° C. for 10 minutes to form a steel plate having a colorless coating thereon. The thickness of the coating on the steel plate after baking was 55 to 60 mg/dm² in all cases.

A dry can-making adhesive (S-100, a product of Toa Gosei Chemical Industry Co., Ltd.; nylon 11; melting point: 188° C.; thickness: 120μ) was interposed between two such coated steel plates, and the assembly was pressed with a hot press at 275° C. for 3 seconds, followed by pressing for 0.3 second at a pressure of 30 kg/cm² using a cooled press (−20° C.) to form a bonded steel plate sample.

After standing overnight, the T-peel strength of the sample was measured at 20° C. at a pulling rate of 200 mm/min using a Schopper tensile tester. The results obtained are shown in Table 2 below.

Furthermore, the same coated steel plates were bonded at a lap width of 5 mm, and the resulting sample was examined for tensile sheath strength at a speed of 10 mm/min. The results are also shown in Table 2.

Table 2

| Example | Polyester | Coloration of Coating | T-peel Strength (kg/25 mm) 1:9* | T-peel Strength (kg/25 mm) 2:8 | Tensile Shear Strength (kg/cm²) 1:9* |
|---|---|---|---|---|---|
| 1 | A | None | 31 | 25 | >180** |
| 2 | B | None | 29 | 22 | >180** |
| 3 | C | None | 30 | — | >180** |
| 4 | D | None | 21 | 26 | >180** |
| 5 | E | None | 20 | 27 | >180** |
| Comparative Example 1 | P | None | 5 | 2 | 37 |

*Weight ratio of polyester (1) to epoxy resin (2)
**The substrate itself was broken.

EXAMPLE 6

Polyester F synthesized in Reference Example 6 was mixed with a bisphenol A type resin (EPIKOTE 1009, a product of Shell Chemical Co.; epoxy equivalent: 2600 to 3500 g/equivalent; OH content: 0.40 g equivalent/100 g) so that the weight ratio of the polyester/epoxy resin became 1:9. The mixture was dissolved in a mixed solvent of 1 part by weight of methoxybutyl acetate, 1 part by weight of methyl Celloslve acetate and 1 part by weight of xylene to form a solution having a nonvolatile concentration of 30%.

The resulting resin solution was coated on a chrome-treated steel plate (Cansuper, a product of Nippon Steel Corporation; 0.17 mm thick; TFS-CT), and air dried. Then the coating was baked for 10 minutes in a hot air drying oven at 175° C. and 200° C., respectively to produce coated steel plates having a colorless coating thereon with a beautiful gloss. The thickness of the coating was varied within the range of 20 to 70 mg/dm².

A dry can-making adhesive (S-160, a product of Toa Gosei Chemical Industry Co., Ltd.; a nylon 12-type adhesive; melting point: 176° C.; thickness: 120μ) was bonded to one surface of the coated steel plate, and the bonded plates were heated to about 260° C. using a 2 kW high frequency induction heater, followed by hammering for 0.1 second with a hammer cooled to 0° C. to form bonded steel plate samples. After standing overnight, the T-peel strengths of the samples thus produced were measured using a Schopper tensile tester at a pulling rate of 200 mm/min at 25° C. and 100° C., respectively. The results obtained are shown in Table 3 below.

The same coated steel plates were bonded with a lap width of 5 mm, and the tensile shear strengths of the bonded samples were measured at a peeling rate of 10 mm/min. The results are also shown in Table 3 below. These bond strengths were sufficient for side seams of three-piece cans.

Table 3

| Baking Temperature (°C.) | Coating Thickness (mg/dm²) | T-peel Strength (kg/5 mm) 25° C. | T-peel Strength (kg/5 mm) 100° C. | Tensile Shear Strength (kg/cm²) 25° C. | Tensile Shear Strength (kg/cm²) 100° C. | Coloration of Coating |
|---|---|---|---|---|---|---|
| 175 | 20 | 4.5 | 3.0 | >180* | 96 | None |
| 175 | 45 | 4.9 | 2.8 | >180* | 110 | None |
| 175 | 70 | 5.0 | 2.7 | >180* | 102 | None |
| 200 | 20 | 6.8 | 4.0 | >180* | 121 | None |
| 200 | 45 | 6.5 | 3.5 | >180* | 108 | None |
| 200 | 70 | 7.2 | 3.3 | >180* | 124 | None |

*The substrate itself was broken.

EXAMPLES 7 to 15 AND COMPARATIVE EXAMPLE 2

Bonding was performed in the same manner as in Example 6 except that each of Polyesters F to N and P synthesized in Reference Examples 6 to 14 and 16 and a bisphenol A type epoxy resin (EPIKOTE 1007, a product of Shell Chemical Co.; epoxy equivalent: 1750 to 2150 g/equivalent; OH content: 0.36 g equivalent/100 g) were used, and baking was performed for 10 minutes at 200° C. to form a coating with a thickness of 20 mg/dm². The T-peel strength of the samples thus obtained was measured for at room temperature (25° C.). The results obtained are shown in Table 4 below.

Table 4

| Example | Polyester | T-peel Strength (kg/5 mm) | Tensile Shear Strength (kg/cm²) | Coloration of Coating |
|---|---|---|---|---|
| 7 | F | 8.6 | >180* | None |
| 8 | G | 7.5 | >180* | None |
| 9 | H | 7.3 | >180* | None |
| 10 | I | 6.8 | >180* | None |
| 11 | J | 5.0 | >180* | None |
| 12 | K | 6.2 | >180* | None |
| 13 | L | 5.0 | >180* | None |
| 14 | M | 4.0 | >180* | None |
| 15 | N | 7.1 | >180* | None |
| Comparative Example 2 | P | 1.2 | 24 | None |

*The substrate itself was broken.

EXAMPLE 16

One part by weight, nonvolatile component, of Polyester F obtained in Reference Example 6 and 9 parts by weight of a mixture of equal weights of EPIKOTE 1007 and EPIKOTE 1009 (bisphenol A type epoxy resins made by Shell Chemical Co.) were dissolved in methyl Cellosolve acetate to form a 50% by weight resin solution. Titanium oxide (Tipaque, a product of Ishihara Sangyo Kaisha Ltd.; particle diameter: 0.35 to 0.45 mm; specific gravity: 4.2) and a small amount of an antifoaming agent (BYK-O, trade name, produced by Mallinckrodt Co. (West Germany)) were added so that the weight ratio of the resin/titanium oxide became 5:5. The mixture was stirred for 1 hour, and then a mixed solvent of 1 part by weight of 3-methoxybutyl acetate and 1 part by weight of xylene was added to dilute the mixture so that the total concentration of the resin and titanium oxide became 50%. The mixture was then passed twice through a sand mill packed with glass beads with a diameter of 0.7 mm to produce a white paint.

The mixture thus obtained was coated on a chromium-treated steel plate (Cansuper, a product of Nippon Steel Corporation; thickness 0.17 mm) to a thickness of 150 mg/dm², and baked for 10 minutes at 200° C. In this way, six coated steel plates having a white glossy coating thereon were produced (designated "Coated Steel Plates A"). Three of these steel plates were each coated with the coating composition obtained in Example 6 to a thickness of 55 mg/dm² as a finishing varnish coat concurrently acting as an adhesive primer, and baked for 10 minutes at 175° C. The steel plates were designated "Coated Steel Plates B".

Test pieces of a predetermined size were prepared from these steel plates, and an adhesive (S100, a product of Toa Gosei Chemical Industry Co., Ltd.; a nylon 11-type adhesive; melting point: 188° C.; thickness: 120μ) was interposed between the test pieces, and the assembly was heated to about 300° C. using a 2 kW high frequency induction heater. Then, the assembly was bumped for 0.1 second with a hammer cooled to 0° C. to form a bonded piece. After standing overnight, the T-peel strengths of the bonded pieces were measured at 20°, 80° and 100° C. in the same manner as in Example 6. The results obtained are shown in Table 5 below.

Table 5

| Measurement Temperature (°C.) | Adherend | |
|---|---|---|
| | Coated Steel Plates A | Coated Steel Plates B |
| 20 | 7.0 | 6.0 |
| 80 | 4.8 | 3.5 |
| 100 | 4.2 | 2.5 |
| Coating Finish | Good | Good |

EXAMPLE 17

A 0.22 mm thick chromium-treated steel plate (Cansuper, a product of Nippon Steel Corporation; TFS-CT as described in Example 6) was used as a can blank. As epoxyphenol paint for an adhesive primer and an inner surface undercoat which contained a phenol/formaldehyde resin prepared from a bisphenol A/o-cresol/-phenol mixture and a bisphenol A-type epoxy resin was coated on the inner surface of the can blank to a thickness of 40 mg/dm², and the coated can blank was baked for 10 minutes at 200° C. in a hot air drying oven. Multicolor printing was accomplished in a customary manner on that surface of the blank which would become the outer surface of the can except for the lap seam bonded parts.

Separately, Polyester F synthesized in Reference Example 6 was mixed with EPIKOTE 1009 (a bisphenol A type epoxy resin made by Shell Chemical Co., Ltd.; epoxy equivalent: 2600 to 3500 g/equivalent; OH content: 0.40 g equivalent/100 g) so that the weight ratio of the polyester/epoxy resin became 1:9. The mixture was dissolved in a mixed solvent of 1 part by weight of methoxybutyl acetate, 1 part by weight of methyl Cellosolve acetate and 1 part by weight of an isomeric mixture of xylenes to form a solution having a nonvolatile concentration of 30%. The solution was used as an adhesive primer and concurrently as a finishing varnish, and applied to the entire surface of the printed area using a roll coater so that the thickness of the coating became 65 mg/dm² after baking. After coating, the coating was baked for 10 minutes in a hot air drying oven at 175° C. to produce a coated steel plate on which neither ink blurring nor discoloration at the glossy printed part occurred.

The scratch resistance of the outside coating of this coated steel plate was found to be good. The following properties of the coating were also examined.

| Pencil Hardness (Mitsubishi Uni) | 2H-3H |
|---|---|
| Xylene Rubbing Test | more than 100 times |
| Crosscut Cellophane Adhesive Tape Peeling Test | 100/100 |

The resulting coated steel plate was slit, and used as a can body blank for a No. 4 can (74.1 mm in diameter and 113 mm in height).

An adhesive (S-160 for can making; a product of Toa Gosei Chemical Industry Co., Ltd.; thickness: 120μ) was applied by heating to the inner surface of the blank along the side seam edge portions, and lap seam bonded can bodies having a lap width of 5 mm were produced from the bonded blanks using a continuous can body maker comprising a spline, a hammer and an intermittent delivery device and fitted with a high frequency induction heating coil at the feed portion immediately before a bumping section for heating both side edges of the blank. The hammer and spline were cooled to −35° C., and both side edges of each can body heated with high frequency induction heating were bumped simultaneously with lapping, whereupon the adhesive solidified within 0.1 second and the bonding was completed.

Each can body was flanged using a flanger, and seamed with can end plates in a customary manner using a seamer thereby to obtain sealed cans.

When 2000 such cans were produced in this manner, no breakage of the lap portion occurred during the flanging treatment. In pressure leakage testing of the sealed cans by introducing air under pressure thereinto, none of the cans leaked at an air pressure 2 kg/cm² and were regarded as acceptable.

The tensile shear strength and T-peel strength at the lap seam portion of ten sealed cans selected at random from the cans thus produced were measured at 25° C. and 100° C. The results obtained are shown in Table 6 below.

Table 6

| | Measurement Speed (mm/min) | Measurement Temperature | |
|---|---|---|---|
| | | 25° C. | 100° C. |
| Tensile Shear Strength (kg/cm²) | 10 | >200* | 107 |
| T-peel Strength (kg/5 mm) | 200 | 6.8 | 3.0 |

The method for obtaining the coated steel plates in Example 17 was in accordance with the method shown in FIG. 4.

EXAMPLE 18

The same epoxyphenol paint as described in Example 17 was coated as an adhesive primer to a thickness of 40 mg/dm² to that surface of a chromium-treated steel plate as described in Example 17 which would become the inner surface of the can. The coating was baked at 160° C. for 10 minutes. Then, that surface of the steel plate which was to be the outside surface of the can was coated entirely with the titanium oxide-containing coating composition produced as described in Example 16 to a thickness of 150 mg/dm² as an adhesive primer and a white coat. The coating was baked at 200° C. for 10 minutes. Then, multicolor printing was applied in a customary manner to the surface of the white coat except for the lap seam portion. Subsequently, a polyester-/epoxy resin paint acting as an adhesive primer and a finishing varnish, as described in Example 16, was coated on the entire surface of the printed surface to a thickness of 55 mg/dm² using a roll coater, and baked at 175° C. for 10 minutes.

The coated steel plate was slit to form a can body blank for a No. 4 can (74.1 mm in diameter and 113 mm in height).

A nylon-type adhesive (S-160, a product of Toa Gosei Chemical Industry Co., Ltd.; 120μ in thickness) was used, and cans (No. 4) were produced in the same manner as in Example 17.

None of the cans thus—obtained leaked on pressure testing at 2 kg/cm². The tensile shear strengths at 25° C. of ten cans selected at random were examined. The materials were broken, and the shear strength was found to be more than 200 kg/cm². The T-peel strengths of the ten cans at 25° C. were found to be 7.1 kg/5 mm.

The method of producing the coated steel plates in this Example was in accordance with that shown in FIG. 3.

Cans produced in quite the same manner as in this Example were filled with soy sauce (100 cc for each can), a brake oil, an engine oil, a liquid anti-freeze, and a paint, and a storage test was performed at 50° C. for 3 months. No leakage ocurred in any of the 80 cans tested.

EXAMPLE 19

A 0.22 mm thick chromium-treated steel plate (Cansuper, a product of Nippon Steel Corporation) was used as a can blank, and coated with the paint described in Example 7 as an inside base coat and an outside size coat. The thickness of the inside coating was 45 mg/dm², and the thickness of the outside coating was 20 mg/dm². These coatings were baked at 200° C. for 10 minutes.

A can-making adhesive (S-100, as described in Example 1 above) was bonded by heating to the inside surface of the blank along the side edge portions of the side seam, and using the same continuous can body maker as described in Example 17, lap seam bonded cans with a lap width of 5 mm were produced.

Each of the cans were flanged in a customary manner, and the cans were filled with distilled water and the bodies were seamed to can ends in vacuo to obtain sealed cans. The cans obtained were subjected to retort sterilizing treatment at 120° C. for 2 hours. None of the cans so produced leaked.

EXAMPLES 20 to 24

The same coating composition as described in Example 7 was coated on the outside surface of each of a chromium-treated steel plate and various kinds of steel plates as shown in Table 7 below to a thickness of 20 mg/dm², and baked at 200° C. for 10 minutes.

A can-making adhesive (S-160, as described in Example 6 above) was bonded by heating to the can blank along the side edges of the interior side seam, and by using the same continuous can body maker as described in Example 17, lap seam bonded cans with a lap width of 5 mm were obtained. The bond strength of these cans were determined, and the results obtained are shown in Table 7 below.

Table 7

| Example | Steel Plates Type | Thickness (mm) | T-peel Strength (kg/5 mm) |
|---|---|---|---|
| 20 | Chromium-treated steel plate | 0.22 | 8.0 |
| 21 | Tin plate | 0.24 | 5.4 |
| 22 | Zinc-treated steel plate | 0.24 | 6.1 |
| 23 | Non-treated steel plate | 0.22 | 7.5 |
| 24 | Ultrathin nickel-plated steel plate | 0.24 | 6.8 |

While the invention has been described in detail and with reference to specific embodiments thereof, it will be apparent to one skilled in the art that various changes and modifications can be made therein without departing from the spirit and scope thereof.

What is claimed is:

1. A method for bonding steel plates with a polyamide adhesive, comprising first applying a composition comprising (1) a polyester resin comprising the reaction product of (a) a polycarboxylic acid component comprising at least one of a polycarboxylic acid, an anhydride thereof, an ester thereof or a mixture thereof with (b) a polyhydric alcohol component comprising at least one of polyhydric alcohol or a mixture thereof, with at least some of one of the polycarboxylic acid component and the polyhydric alcohol component being trivalent of higher, wherein the ratio R of the polycarboxylic acid component (a) to the polyhydric alcohol component (b) in said polyester resin satisfies the relationship $$R = \frac{M_{a-1} + M_{a-2}}{H_{b-1} + H_{b-2}} = \text{about 0.5 to about 2}$$

where $M_{a-1}$ is the total moles of the polycarboxylic acid component which is trivalent or higher; $M_{a-2}$ is the total moles of the polycarboxylic acid component which is divalent; $H_{b-1}$ is the total hydroxyl equivalents of the polyhydric alcohol component which is trivalent or higher, and $H_{b-2}$ is the total hydroxyl equivalents of the polyhydric alcohol component which is divalent, and (2) a bisphenol A-type epoxy resin, on a steel plate; baking the coating by heating; juxtaposing said coated steel plates to be bonded with a polyamide adhesive therebetween; and bonding said steel plates with said polyamide adhesive.

2. The method of claim 1, wherein the polyester resin (1) comprises the reaction product of a trivalent or higher polycarboxylic acid as said component (a) with a trihydric or higher alcohol as said component (b).

3. The method of claim 1, wherein the polyester (1) comprises the reaction product of trimellitic anhydride as component (a) with pentaerythritol as component (b).

4. The method of claim 1, wherein the polyester (1) comprises the reaction product of trimellitic anhydride as component (a) with trimethylol propane as component (b).

5. The method of claim 1, wherein the bisphenol A-type epoxy resin (2) has an epoxy equivalent of at least about 1200 g/equivalent.

6. The method of claim 1, wherein the polyester (1) comprises the reaction product of a mixture of a trivalent or higher polycarboxylic acid with a divalent carboxylic acid as component (a), or a mixture of a trihydric or higher alcohol with a dihydric alcohol as component (b).

* * * * *